Oct. 11, 1960

W. J. RYAN 2,955,477

AUTOMATIC POWER TRANSMISSION

Original Filed Sept. 26, 1951

INVENTOR.
WILLIAM J. RYAN
BY
Eugene C. Knoblock
ATTORNEY.

Oct. 11, 1960 — W. J. RYAN — 2,955,477
AUTOMATIC POWER TRANSMISSION
Original Filed Sept. 26, 1951 — 2 Sheets-Sheet 2

INVENTOR.
WILLIAM J. RYAN.
BY
Eugene C. Knoblock
ATTORNEY.

United States Patent Office 2,955,477
Patented Oct. 11, 1960

2,955,477

AUTOMATIC POWER TRANSMISSION

William J. Ryan, 601 S. Pennsylvania St., Denver, Colo.

Original application Sept. 26, 1951, Ser. No. 248,315. Divided and this application Jan. 25, 1954, Ser. No. 405,751

8 Claims. (Cl. 74—190)

This invention relates to improvements in an automatic power transmission, and more particularly to a reaction controlled, progressively variable speed controlling automatic power transmission which is particularly well suited for use in automotive vehicles. This application is a division of my co-pending patent application, Serial No. 248,315, filed September 26, 1951 and now Patent No. 2,755,683.

The primary object of the invention is to provide a complete range of variable output speeds from neutral to direct drive and to provide for reverse drive, and also to provide backlash decelerating speed ratios.

A further object of the invention is to provide a device of the planetary gear type, wherein variable speeds can be directed to the output member by resisting the movement of the reaction sun gear. For example, in this device, when the reaction gear is operated at the same speed as the drive member, all of the gearing will be in direct drive; when the reaction gear is allowed to revolve at a certain speed above the speed of the drive shaft, the transmission will be in neutral; when the reaction gear is driven faster than its speed for neutral setting, the transmission will be in reverse; and, when the reaction gear is held at a speed slower than that of the drive shaft, the transmission will be an over-drive.

A further object is to provide a transmission device having an epicyclic gearing, wherein a reaction gear has a multiplying leverage through planetary gearing in allowing a drive member to overrun a driven member so that in the very low speed range, as when starting a load, the torque applied to the reaction member will be small, but will increase progressively as operation of the transmission progressively absorbs the starting load until the transmission reaches direct drive, and wherein the planet gearing will continue to take a portion of the torque reaction pressure when the device is in direct drive.

A further object is to provide a transmission device having a planetary gearing, wherein the peripheral dimension of the sun gear which controls torque reaction is small compared to the output gear, so that the reaction controlling the sun gear will have a corresponding leverage which acts in the device with the reduction offered by the equalizer or planet gears to reduce reaction torque at the sun gear to a small fraction of that applied to the output gear while in direct drive, whereby the torque reaction may be taken effectively by a variable speed mechanism of a type capable of transmitting only a small torque compared to the torque required at the output member.

A further object is to provide a device of this character having a primary planetary gearing system and a secondary planetary gearing system in which a planet gear carrier of the secondary system is directly connected to a torque reaction gear of the primary system, the output gear of the primary system is connected to the sun gear of the secondary system, and the outer gear of the secondary system and the torque reaction gear of the primary system are interconnected by a variable speed control device, and in which the parts are so related that the range of variability required in the speed control device is small.

A further object of the invention is to provide a device of this character having a novel friction drive, variable speed control mechanism.

A further object of the invention is to provide a transmission which will normally operate in a direct drive or overdrive relation at both fast and slow vehicle speeds and at all times except when the vehicle is starting or is subjected to a heavy pull, as when accelerating rapidly or when climbing a steep grade.

Other objects will be apparent from the following specification.

Figure 1:
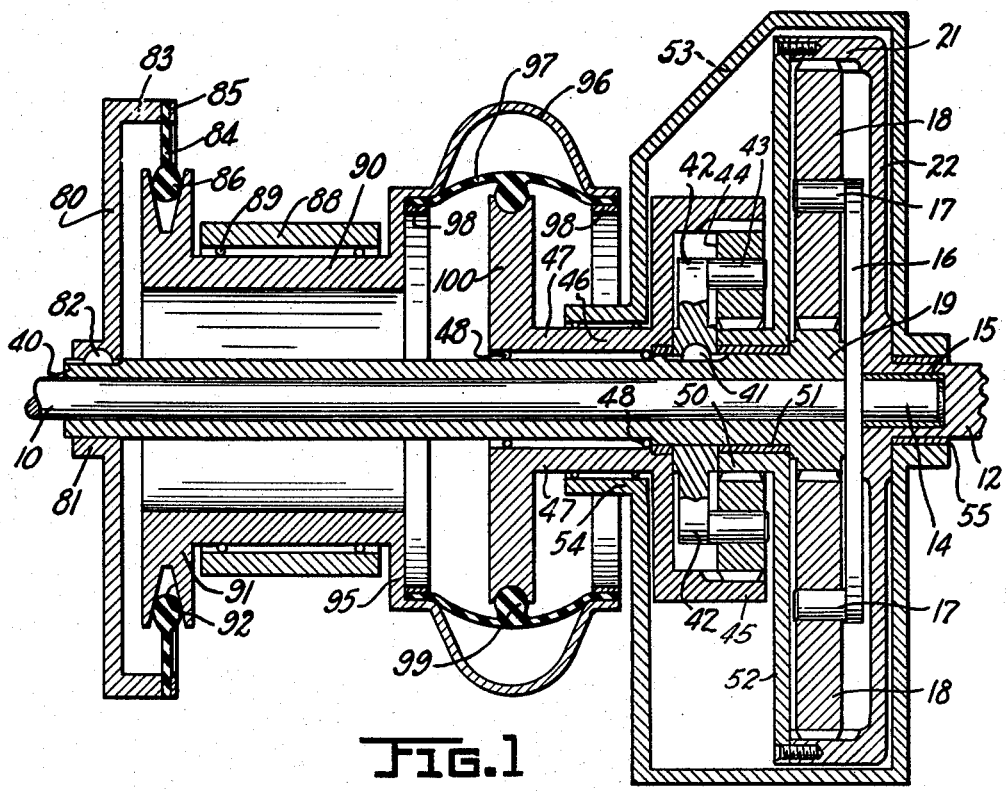
Fig. 1 is an axial sectional view of a speed control device forming an embodiment of my invention.

Referring to the drawing which illustrates one embodiment of the invention, a drive shaft 10 mounts a planetary carrier 16 with its stud shafts or spindles 17 which journal planet gears 18. An output ring gear 21 is connected by means of a spider or yoke 22 with the driven shaft 12. A sun gear 19 rotatably encircles and is journaled upon the drive shaft 10, and the planet gears 18 each mesh with the sun gear 19 and the output ring gear 21. The drive shaft 10 includes a forwardly projecting pilot portion 14 which is journaled in a bearing sleeve 15 received in a recess in the end of the driven shaft 12.

The sun gear 19 has an elongated hub or sleeve portion 40 journaled on the shaft 10. To this hub portion 40 is keyed at 41 a planet carrier 42 of a secondary planetary or epicyclic gear system. This planet carrier 42 includes one or more stud shafts 43, each of which rotatably supports a secondary planet gear 44. An internally toothed secondary ring gear 45 encircles the sleeve 40 and shaft 10 concentrically therewith and meshes with the secondary planet gear or gears 44. This secondary ring gear 45 is carried by a spider 46 or the like, mounted upon a hub 47 which is journaled as by bearing 48 upon the sleeve 40. The secondary epicyclic gearing system includes a sun gear member 50 journaled upon the sleeve 40 as by a bearing 51 and meshing with the secondary planet gear or gears 44. A plate or spider 52 connects the secondary sun gear 50 with the primary output ring gear 21.

The gearing is preferably encased within a housing 53 from which the sleeve 40 projects rotatably as through a bearing or journal 54. The housing 53 also includes a journal portion 55 in which the output shaft 12 is journaled and through which said output shaft projects.

This embodiment of the invention minimizes the range of variability required in the variable control mechanism (to be described) without increasing the torque reaction applied to that mechanism.

In this device the primary torque reaction is divided or directed into two paths. One reaction is in the nature of regenerative power applied from the secondary sun gear 50 to the output ring gear 21. The other path of reaction is a secondary reaction controlled by the variable control mechanism and its connection with the secondary ring gear 45.

At very low output speeds, as in starting from neutral, the primary reaction torque pressure offered to the secondary epicyclic gearing system and to the variable control is small. As the transmission gradually comes to a direct drive, the reaction torque pressure gradually increases. The portion of the torque reaction pressure which is applied to the secondary epicyclic gearing and to the variable speed reaction control is divided between those parts so that the variable speed control device is called upon to withstand or take up only a small torque reaction. When the device is in direct drive, the secondary gearing will be locked as a single unit by the variable control so that substanitally all of the primary torque reaction will be applied to the output member and only a very small or negligible part of the primary torque reaction will be applied to the variable speed control.

One characteristic of the invention is that it has a high speed of rotation in the torque reaction path, and particularly in the secondary epicyclic gearing. This high speed operation continues only during operation of the device in neutral, and progressively decreases as the device operates and approaches a direct drive, at which the parts all revolve at the same speed. The invention also provides proper speed ratios in backlash decelerating effect.

The device requires comparatively high speed operation of the speed control at neutral setting, and an even higher speed for a reverse operation of the output shaft, and it is this speed of operation which produces the low torque reaction pressure applied to the control. This same relation of the parts also provides for an overdriving relation, especially if the gear reduction at the rear axle of the motor vehicle employing the device is somewhat less than standard present article.

In the operation of the device it will be apparent that, when the device is starting from a stopped position, the rotation of drive shaft 10 will cause rotation of the planet carrier 16 and the planet gears 18 of the primary epicyclic gearing which tends to operate the sun gear 19 at a high speed. This speed is applied to the planet carrier 42 of the secondary epicyclic gearing which is converted into rotation of the outer ring gear 45 of the secondary gearing. The variable speed control mechanism, to be described, driven from the sun gear 19 of the primary epicyclic gearing, absorbs or takes up a torque reaction. Thus, assuming that the variable speed control mechanism is normally positioned in a neutral setting, adjustment of the speed control in one direction will cause a reduction in the speed of rotation of the outer ring gear 45 of the secondary epicyclic gearing and, as this reduction occurs, an increase in the regenerative action applied at the secondary sun gear 50 will occur, which is in turn applied to the outer ring gear 21 of the primary gearing. This will result in a reduction of the speed of rotation of the secondary planet carrier 42 and of the sun gear 19, thus increasing the speed of the outer ring gear 21 of the epicyclic gearing.

In the speed control mechanism here shown, a rigid disk 80 is mounted upon the outer end of the sleeve 40 having a hub 81 which is keyed to said sleeve at 82. The disk 80 has a cylindrical flange 83 at its outer margin and an annular resilient member 84 is marginally secured to said flange as by a clamping ring 85. The annular resilient member 84 has a resilient inner rim portion or bead 86 of enlarged cross-sectional dimension.

Figure 3:
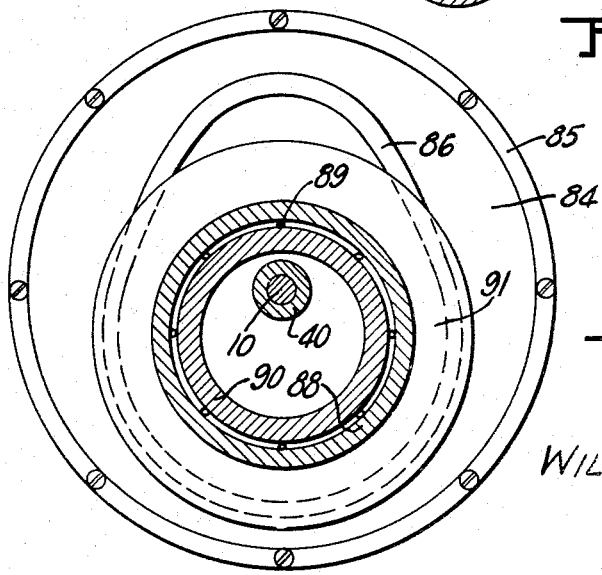
Fig. 3 is a transverse sectional view taken on line 7—7 of Fig. 2.

An annular carrier 88, mounted adjustably for movement toward and from centered relation with the sleeve 40, has journaled therein, as by the bearings 89, a cylindrical member 90 having an internal bore much larger than the external cross-sectional diameter of the sleeve 40 which it encircles. Upon one end of the cylindrical member 90 is mounted a pulley flange 91 having a V-shaped peripheral pulley groove 92. The pulley 91, 92 is so proportioned in size to the size of the annular member 84 and its inner bead 86 that, when the parts are concentric as illusttrated in Fig. 1, the bead 86 will have a wedged continuous frictional driving engagement in the pulley groove 92. When the member 88 is shifted to move the cylinder 90 and the pulley 91, 92 into off-center relation with respect to the sleeve 40 and the remaining parts, the resilient member 84, which preferably is formed of natural rubber or synthetic rubber, will be stretched as illustrated in Fig. 3, so that the pulley 91, 92 will be caused to operate at a greater speed than the sleeve 40, the disk 80 and the resilient ring 84.

The cylindrical member 90 fixedly mounts at the end thereof opposite the pulley 91 and between its carrier 88 and the gear housing 53, a circular housing part, here illustrated as consisting of the outwardly projecting wall portion 95, and a marginal portion 96 of arched axial cross-sectional shape. A cylindrical resilient member 97 is anchored at its opposite ends at 98 to the longitudinally spaced parts of the member 96, whereby its central portion is normally spaced inwardly from the crown or central portion of the member 96. The cylindrical resilient member 97 will preferably be provided with a central circumferential internal projecting part or rib 99 which may be of any suitable cross-sectional shape, being illustrated in Fig. 1 as of part-circular cross-section and being illustrated in Fig. 2 as of comparatively flat cross-section. A pulley member 100 has an external circumferential configuration to receive the circumferential rib 99, which preferably constrictively fits thereon to provide a direct drive relation between the parts when the member 88 is positioned concentrically of the sleeve 40 as illustrated in Fig. 1. The pulley member 100 is mounted upon the hub portion 47' of the carrier 46 for the outer ring gear of the secondary epicyclic gearing of the gearing unit, being journaled externally upon the sleeve 40 by means of bearing 48', said sleeve 47' projecting externally from the housing 53. The housing 53 will be provided with a journal 54' which encircles the hub portion 47'.

Figure 2:
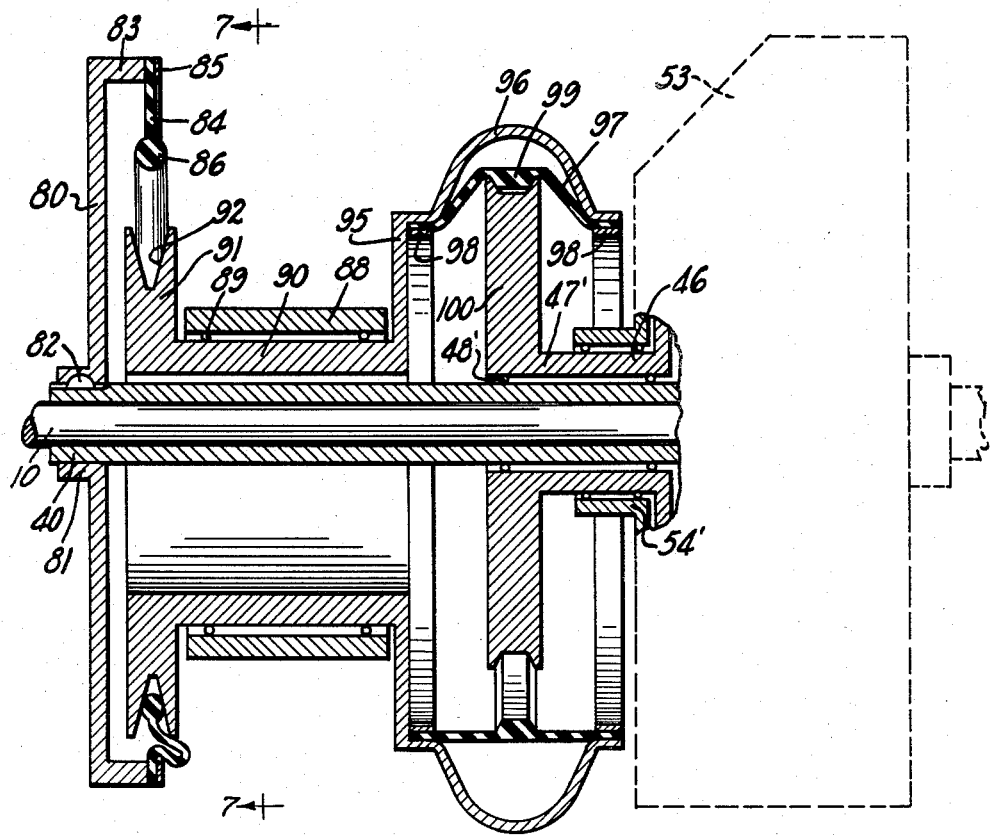
Fig. 2 is an axial sectional view similar to Fig. 1, but illustrating the parts in a different adjustment.

It will be apparent that the movement of the members 88 and 90 between concentric and eccentric relation with reference to the sleeve 40 will change the driving relation between the resilient rib 99 and the pulley 100, and between the bead 86 and the pulley 91, 92, as illustrated in Figs. 5 and 6. Thus, when the parts are arranged concentrically in full peripheral contact, a one-to-one drive ratio will exist between the parts 99 and 100 and between the parts 84 and 91. As soon, however, as the parts 88 and 90 are moved off-center with respect to the sleeve 40, the resilient members 84 and 97 are distorted and stretched as illustrated in Fig. 2, and their respective contacts with their pulleys are limited to a partial peripheral contact only. This contact is substantially the same at the two pulleys 91 and 100, but the frictional driving contacts at said pulleys are located diametrically oppositely, as best seen in Fig. 2. In the neutral drive position of the mechanism, the parts 88 and 90 will be positioned off-center with reference to the sleeve 40. When the parts are in direct drive, the parts 88 and 90 will be concentric with the sleeve 40, as illustrated in Fig. 5. When a reverse drive is desired, the off-center relation relative to the parts 88 and 90 relative to the hub 40 will be increased greater than the eccentricity of said parts for the neutral adjustment.

It will be understood that the Fig. 2 adjustment of the parts is extreme and beyond that which normally would be required for operative neutral setting of the mechanism. One feature illustrated in Fig. 2 is to be observed, however, and that is that the stretching of the member 84 by the pulley 91 entails a reduction of the cross-sectional dimension of the bead 86. The normal cross-section of the bead 86 is preferably slightly greater than the width of the mouth of the tapered groove 92 so that it has a wedge fit in said groove. As the bead is stretched and its cross-section is reduced, it will sink deeper into the tapered groove 92. The decrease in cross-section of the bead and the sinking of the bead deeper into the groove supplements the speed changing action resulting from the eccentric movement of the parts so that a small amount of eccentricity between the parts 88 and 40 will produce a substantial change in the speed ratio. The speed change will, of course, essentially result from the fact that the stretching of member 84 increases the length of the inner periphery of said member at the bead 86. The same result occurs when the pulley 100 moves to an eccentric position with respect to the circumferential resilient rib 99.

I claim:

1. A variable speed mechanism having a driving member, a driven member axially aligned with said driving member, one of said members including a pulley, the other member including a yieldable resilient and extensible annular member, a member shiftable bodily relative to said driving and driven members between concentric and off-center positions relative thereto, and a rotatable unit journaled by said shiftable member and including a second pulley encircled by and having frictional driving engagement with said annular member, and a second annualr yieldable resilient and extensible member encircling and having friction driving engagement with said first pulley.

2. A variable speed mechanism comprising frictionally engaging parts including a pulley and a resilient extensible belt encircling said pulley, and means for shifting one of said parts relative to the other between concentric and predetermined eccentric positions to stretch said belt and thereby vary the ratio of driving speed between said parts, said belt having continuous peripheral driving engagement with said pulley when said parts are concentric.

3. A variable speed mechanism comprising frictionally engaging parts including a pulley and a resilient extensible belt encircling said pulley, and means for shifting one of said parts relative to the other to stretch said belt and thereby vary the ratio of driving speed between said parts, said pulley having a peripheral V-shaped groove and said belt including a bead portion normally seating in said groove adjacent the mouth thereof, said bead portion reducing in cross-sectional dimension as said belt is stretched so that it may progressively seat deeper in said groove as said belt is progressively stretched.

4. A variable speed mechanism comprising frictionally engaging parts including a pulley and a resilient extensible belt encircling said pulley, and means for shifting one of said parts relative to the other to stretch said belt and thereby vary the ratio of driving speed between said parts, said belt constituting a sheet of resilient material adapted to be anchored to a support adjacent its outer margin and having a central opening defining a pulley engaging inner margin.

5. A variable speed mechanism comprising frictionally engaging parts including a pulley and a resilient extensible belt encircling said pulley, and means for shifting one of said parts relative to the other to stretch said belt and thereby vary the ratio of driving speed between said parts, said belt constituting a sheet of resilient material adapted to be anchored to a support adjacent its outer margin and having a central opening outlined by a marginal bead portion of greater cross-sectional dimension than said sheet.

6. A variable speed mechanism comprising frictionally engaging parts including a pulley and a resilient extensible belt encircling said pulley, and means for shifting one of said parts relative to the other between concentric and predetermined eccentric positions to stretch said belt and thereby vary the ratio of driving speed between said parts, said belt constituting a substantially cylindrical member adapted to be anchored to a rotatable support at its opposite ends and having an annular portion of increased thickness intermediate its ends frictionally engaging said pulley.

7. A variable speed mechanism comprising a unit including a pair of concentric relatively rotatable parts, a rotatable second unit encircling a portion of said first unit, means for bodily shifting one unit relative to the other transverse of the axis of said rotatable parts, and a friction drive between said second unit and the respective rotatable parts of said first unit and including a pair of pulleys and a resilient extensible belt encircling each pulley and having frictional driving engagement therewith, said belts being stretched upon displacement of said units from concentric relation.

8. A variable speed mechanism comprising a unit including a pair of concentric relatively rotatable parts, a rotatable second unit encircling a portion of said first unit, means for bodily shifting one unit relative to the other transverse of the axis of said rotatable parts, and a friction drive between said second unit and the respective rotatable parts of said first unit and including a pair of pulleys and a resilient extensible belt encircling each pulley and having frictional driving engagement therewith, said belt being stretched upon displacement of said units from concentric relation, one of said rotatable parts mounting one of said pulleys and the other rotatable part mounting one of said belts, said second unit mounting the other pulley and belt.

References Cited in the file of this patent

UNITED STATES PATENTS

| 2,000,593 | Happel | May 7, 1935 |
| 2,186,662 | Berger | Jan. 9, 1940 |
| 2,247,153 | Ewart | June 24, 1941 |

FOREIGN PATENTS

| 908,450 | France | Sept. 17, 1945 |
| 1,012,440 | France | Apr. 16, 1952 |